(12) United States Patent
Chen et al.

(10) Patent No.: US 12,489,292 B2
(45) Date of Patent: Dec. 2, 2025

(54) POWER CONTROL METHOD, SYSTEM, AND DEVICE

(71) Applicant: Fulian precision electronics (Zhengzhou) Co., Ltd, Zhengzhou (CN)

(72) Inventors: Wen-Chin Chen, New Taipei (TW); Nien-Yi Jan, New Taipei (TW); Qing-Yu Wang, Shenzhen (CN); Jiao-Jie Wang, Shenzhen (CN)

(73) Assignee: Fulian precision electronics (Zhengzhou) Co., Ltd, Zhengzhou (CN)

( * ) Notice: Subject to any disclaimer, the term of this patent is extended or adjusted under 35 U.S.C. 154(b) by 489 days.

(21) Appl. No.: 17/991,737

(22) Filed: Nov. 21, 2022

(65) Prior Publication Data

US 2023/0208136 A1 Jun. 29, 2023

(30) Foreign Application Priority Data

Dec. 27, 2021 (CN) .......................... 202111616692.9

(51) Int. Cl.
*G05B 19/042* (2006.01)
*H02J 3/00* (2006.01)
(52) U.S. Cl.
CPC ............ *H02J 3/007* (2020.01); *G05B 19/042* (2013.01); *H02J 3/001* (2020.01); *G05B 2219/2639* (2013.01); *H02J 2203/20* (2020.01)

(58) Field of Classification Search
CPC ........ H02J 3/007; H02J 3/001; H02J 2203/20; H02J 3/003; H02J 3/14; H02J 2310/12; H02J 13/00002; G05B 19/042; G05B 2219/2639; G06N 20/00
See application file for complete search history.

(56) References Cited

U.S. PATENT DOCUMENTS

| 11,270,243 | B1* | 3/2022 | Roy ........................ B60L 53/67 |
| 2016/0239032 | A1* | 8/2016 | Yu ........................... G05B 15/02 |
| 2021/0224708 | A1* | 7/2021 | Le ............................. G06N 5/01 |

* cited by examiner

*Primary Examiner* — Yuhui R Pan
(74) *Attorney, Agent, or Firm* — ScienBiziP, P.C.

(57) ABSTRACT

A power control method optimized against both a shortfall in supply and an oversupply, comprising acquiring scheduling information of a plurality of power supply lines, the scheduling information including electric power data, status data, and operation data of the power supply lines; inputting the electric power data into a first training model to obtain a recommended schedule of turning on the plurality of power supply lines; modifying the recommended schedule according to the status data and the operation data of each of the plurality of power supply lines to obtain an optimal power supply line; turning on the loads connected to the optimal power supply line. The method recommends power supply lines according to the equipment being used in actuality and historically. A power control system and a power control device, are also provided.

17 Claims, 7 Drawing Sheets

| Acquiring the real time current, the real time power, the historical upper limit value of the instantaneous current, the maximum current value that can be tolerated, the warning current value, and the peak power value of the power supply line | — S121 |

↓

| Acquiring instantaneous current, historical rated current, and historical power of the loads scheduled for each power supply line according to principle of scheduling the loads allocated to each power supply line | — S122 |

↓

| Calculating power differential value of each power supply line | — S123 |

↓

| Inputting the power differential values of the plurality of power supply lines into the first training model to obtain scores for the plurality of power supply lines | — S124 |

↓

| Obtaining the recommended schedule of turning on the plurality of power supply lines | — S125 |

Acquiring the power value of remaining power supply lines in the first modified recommended schedule in a preset period, and calculating an average value of peak power value of each power supply line in each preset period, then a maximum average peak power value of each of the remaining power supply line can be obtained by comparing and selecting — S151

Modifying a peak power value for each remaining power supply line by multiplying the maximum value of the average peak power values of each remaining power supply line and its correction factor — S152

Regulating a sequence of the remaining power supply lines in the first modified recommended schedule of turning on the plurality of power supply lines according to the modified peak power values of the remaining power supply lines to obtain a second modified recommended schedule of turning on the plurality of power supply lines — S153

POWER CONTROL METHOD, SYSTEM, AND DEVICE

CROSS-REFERENCE TO RELATED APPLICATIONS

This application claims priority to China Application No. 202111616692.9, having a filing date of Dec. 27, 2021, filed in China State Intellectual Property Administration, the entire contents of which are hereby incorporate by reference.

FIELD

The subject matter relates to power control technologies, and more particularly, to a power control method, a power control system, and a power control device.

BACKGROUND

Electrical power supply must be controlled for ensuring a safe and stable operation of a power grid, which provides a reliable power supply and ensures that all kinds of work can be carried out in an orderly manner.

However, existing power control methods cannot reasonably recommend suitable dedicated lines according to the actual power consumption of the equipment. The existing power control systems are operated by experienced users, they select a dedicated line subjectively according to historical experience for such large-scale equipment, but such lack of evidence-based selection can lead to misjudgment and cause tripping out when the capacity of the dedicated line is too small and waste of electricity when the capacity of the dedicated line is too large.

SUMMARY

An objective of the present disclosure is achieved by providing a power control method, system, device, and computer readable storage medium.

A first aspect of the present disclosure provides a power control method, comprising: acquiring scheduling information of a plurality of power supply lines, wherein the scheduling information includes electric power data, status data, and operation data of the power supply lines; inputting the electric power data of the plurality of power supply lines into a first training model to obtain a recommended schedule of turning on the plurality of power supply lines; modifying the recommended schedule of turning on the power supply lines according to the status data and the operation data of the plurality of power supply lines to obtain an optimal power supply line; and turning on the loads connected to the optimal power supply line.

According to further embodiments, the electric power data of the power supply lines comprises real-time electric power data and historical electric power data; inputting the electric power data of the plurality of power supply lines into a first training model to obtain a recommended schedule of turning on the plurality of power supply lines comprises: acquiring the historical electric power data of the plurality of power supply lines, wherein the historical electric power data comprises historical upper limit values of the instantaneous current, maximum current values that can be tolerated, warning current values, peak power values of the power supply lines, and rated currents and rated powers drawn by the loads connected to the power supply lines; acquiring the real-time electric power data of the plurality of power supply lines at the present, wherein the real-time electric power data comprises real time current, real time power, instantaneous current of the loads connected to the power supply line; calculating power differential value of each of the plurality of power supply lines according to the real-time electric power data and the historical electric power data of the plurality of power supply lines; inputting the power differential values of the plurality of power supply lines into the first training model to obtain scores of each of the plurality of power supply lines; ranking the plurality of power supply lines according to their scores and setting rules to obtain the recommended schedule of turning on the plurality of power supply lines.

In further embodiments, the power differential values of the power supply lines comprise instantaneous current differential values, differential values of the maximum current that can be tolerated, warning current differential values, and peak power differential values of the power supply line; wherein the instantaneous current differential value is a differential value between the upper limit value of the instantaneous current of the power supply line and a sum of the real-time current of the power supply line and the instantaneous current of the load connected to the power supply line; the differential value of the maximum current that can be tolerated by the power supply line is a differential value between the maximum current that can be tolerated by the power supply line and a sum of real-time current of the power supply line and the instantaneous current of the load connected to the power supply line that is scheduled to be turned on; the warning current differential value of the power supply line is a differential value between the warning current value of the power supply line and a sum of the real-time current value of the power supply line and the rated current of the load connected to the power supply line that is scheduled to be turned on; the peak power differential value of the power supply line is a differential value between the peak power value of the power supply line and a sum of the real-time power of the power supply line and the rated power of the load connected to the power supply line that is scheduled to be turned on.

In further embodiments, modifying the recommended schedule of turning on the power supply lines according to the status data and the operation data of the plurality of power supply lines to obtain an optimal power supply line comprises: performing a first modification to the recommended schedule of turning on the power supply lines according to the status data of the plurality of power supply lines to obtain a first modified recommended schedule of turning on the power supply lines; inputting operation data of remaining power supply lines in the first modified recommended schedule into a second training model to obtain a correction factor for each of the plurality of power supply lines; performing a second modification on the first modified recommended schedule of turning on the plurality of power supply lines by the correction factors to obtain a second modified recommended schedule of turning on the plurality of power supply lines; acquiring an optimal power supply line to turn on according to the second modified recommended schedule.

In further embodiments, the status data of the power supply line comprises abnormal status data of the power supply line and maintenance data and abnormal status data of the loads connected to the power supply line; performing a first modification to the recommended schedule of turning on the power supply lines according to the status data of the plurality of power supply lines comprises: acquiring the abnormal status data of each power supply line in the recommended schedule, the number of loads connected to each power supply line, and the maintenance data and abnormal status data of the loads in real time; determining whether each power supply line is normal according to the abnormal status data of each power supply line, and removing power supply lines which are abnormal from the recommended schedule; determining whether the remaining power supply lines are available, and removing unavailable power supply lines of the remaining power supply lines from the recommended schedule; and determining whether the number of the loads that are available on the power supply lines is zero according to the maintenance data and abnormal status data of the loads connected to the power supply lines, and removing the power supply lines without any available loads from the recommended schedule to obtain the first modified recommended schedule of turning on the power supply lines.

According to further embodiments, the operation data of the power supply line comprises production capacity data of the power supply line, the power consumption of the power supply line during a preset period, and current ambient temperature. Inputting operation data of remaining power supply lines in the first modified recommended schedule into a second training model to obtain a correction factor for each power supply line comprises: acquiring the production capacity data and the power consumption of the power supply line of the remaining power supply lines in the first modified recommended schedule during a preset period, and the current ambient temperature; simulating a maximum power value, a minimum power value, an initial power value and a finishing power value used by the remaining power supply lines within the preset period based on the electric power data of the remaining power supply lines in the first modified recommended schedule within the preset period; inputting the production capacity data of the remaining power supply lines, the ambient temperature data, and the maximum power values, minimum power values, initial power values, and the finishing power values of the remaining power supply lines within the preset period into a second training model to obtain power values of the remaining power supply lines at a preset time point in the future; acquiring real-time powers of the remaining power supply lines at the present time and predicting future power consumption trend of each of the remaining power supply line according to the real-time powers of the remaining power supply lines and the power values of the remaining power supply lines at the preset time point in the future; and generating a correction factor for each of the remaining power supply line according to the future power consumption trend of the remaining power supply lines.

According to further embodiments, the correction factor of one of the remaining power supply lines is set to be less than 1 if the future power consumption trend of said one of the remaining power supply lines is rising; the correction factor of one of the remaining power supply lines is set to be greater than 1 if the future power consumption trend of said one of the remaining power supply lines is decreasing; and the correction factor of one of the remaining power supply lines is set to be 1 if the future power consumption trend of said one of the remaining power supply lines remains unchanged.

In further embodiments, performing a second modification on the first modified recommended schedule of turning on the plurality of power supply lines by the correction factors further comprises: acquiring power value of each of the remaining power supply lines in the first modified recommended schedule in a preset period; modifying a peak power value of each of the remaining power supply lines based on the power value of each of the remaining power supply lines in the preset period and the corresponding correction factors; regulating a sequence of the remaining power supply lines in the first modified recommended schedule of turning on the plurality of power supply lines according to the modified peak power values of the remaining power supply lines to obtain a second modified recommended schedule of turning on the plurality of power supply lines.

According to further embodiments, modifying the power value of each of the remaining power supply lines comprises: dividing the preset period into multiple time periods according to a preset time interval; determining the peak power value of each of the remaining power supply lines in the multiple time periods based on the power value of each of the remaining power supply lines in the preset period, and calculating an average value of the peak power value of each of the remaining power supply lines in each time period; comparing the average value of the peak power value of each of the remaining power supply lines in the multiple time periods to select a maximum one for each of the remaining power supply line, and taking the maximum one as a maximum average peak power value of each of the remaining power supply line; and calculating a modified peak power value for each of the remaining power supply line by multiplying the maximum average peak power value of each of the remaining power supply line and its correction factor.

A second aspect of the present disclosure provides a power control system, comprising: a data acquiring module configured for acquiring scheduling information of a plurality of power supply lines, wherein the scheduling information includes electric power data, status data, and operation data of the power supply line; a scheduling module configured for inputting the electric power data of the plurality of power supply lines into a first training model to obtain a recommended schedule of turning on the plurality of power supply lines; a modifying module configured for modifying the recommended schedule of turning on the power supply lines according to the status data and operation data of the plurality of power supply lines to obtain an optimal power supply line ready to turn on; and an output module configured for turning on the loads on the optimal power supply line.

A third aspect of the present disclosure provides a power control device, comprising a memorizer, a processor, and a program stored on the memorizer and executable by the processor, wherein the program is executed by the processor to implement steps of the power control method above mentioned.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish elements and are not used to denote a particular order or imply a number of technical features, therefore, unless being specifically defined, features described as "first" and "second" may expressly or implicitly include one or more of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

A detailed description of the hereinafter described embodiments of the disclosure is presented herein by way of exemplification and not limitation with reference to the figures.

Figure 1:
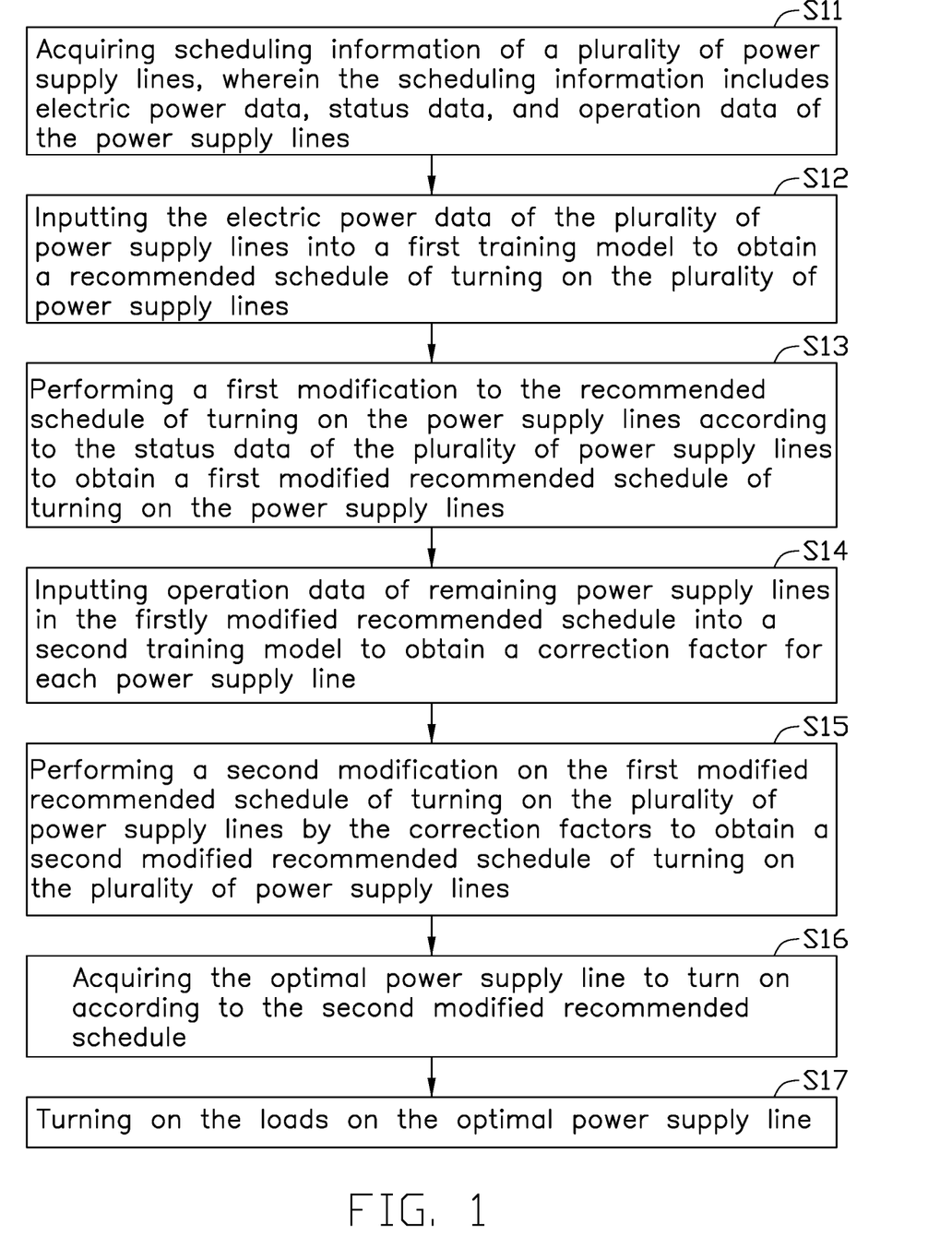
FIG. 1 is a flow diagram of a power control method according to an embodiment of the present disclosure.

FIG. 1 shows a flow diagram of a power control method according to an embodiment, it should be noted that, only steps related to the embodiments are shown and the steps can be implemented in different orders, or some steps skipped.

Referring to FIG. 1, the power control method comprises:

S11: acquiring scheduling information of a plurality of power supply lines, wherein the scheduling information includes electric power data, status data, and operation data of the power supply lines.

In the embodiment, a plurality of power supply lines are arranged and each line has corresponding scheduling information, the scheduling information includes electric power data, status data, and operation data of the power supply line. The scheduling information can be stored in a database for generating an arrangement sheet.

The electric power data of the power supply line comprises real-time electric power data and historical electric power data, wherein the real-time electric power data includes the real-time current, real-time power, and the instantaneous current of the load connected to the power supply line; the historical electric power data includes the upper limit value of the instantaneous current of the power supply line, the maximum current that can be tolerated, the warning current value, the peak power value, and the rated current and rated power of the load connected to the power supply line. It should be noted that the loads connected to the power supply line are refrigerators and freezers, air compressors, etc. connected to the power supply line.

The status data of the power supply line comprises abnormal status data of the power supply line, and maintenance data and abnormal status data of the loads connected to the power supply line.

It should be noted that the abnormal status data of the power supply line indicates unavailability of a power supply line when there is abnormal data such as the power supply line being out of service. The maintenance data and abnormal status data of the loads connected to the power supply line indicate the usage of the loads connected to the power supply line, for example, the load may be under maintenance or may be damaged.

The operation data of the power supply line comprises the production capacity data of the power supply line, the power consumption of the power supply line during a preset period, and the current ambient temperature.

It should be noted that, the production capacity data of the power supply line is the capacity allocation of the power supply line within a preset period.

S12: inputting the electric power data of the plurality of power supply lines into a first training model to obtain a recommended schedule of turning on the plurality of power supply lines.

For example, the first training model is a reinforcement learning model, and ten power supply lines are provided, then the electric power data of the ten power supply lines are input into the pre-trained reinforcement learning model to obtain the recommended schedule for the ten power supply lines in order from good to bad. The reinforcement learning model can be updated in real time with the data in the arrangement sheet.

Figure 2:
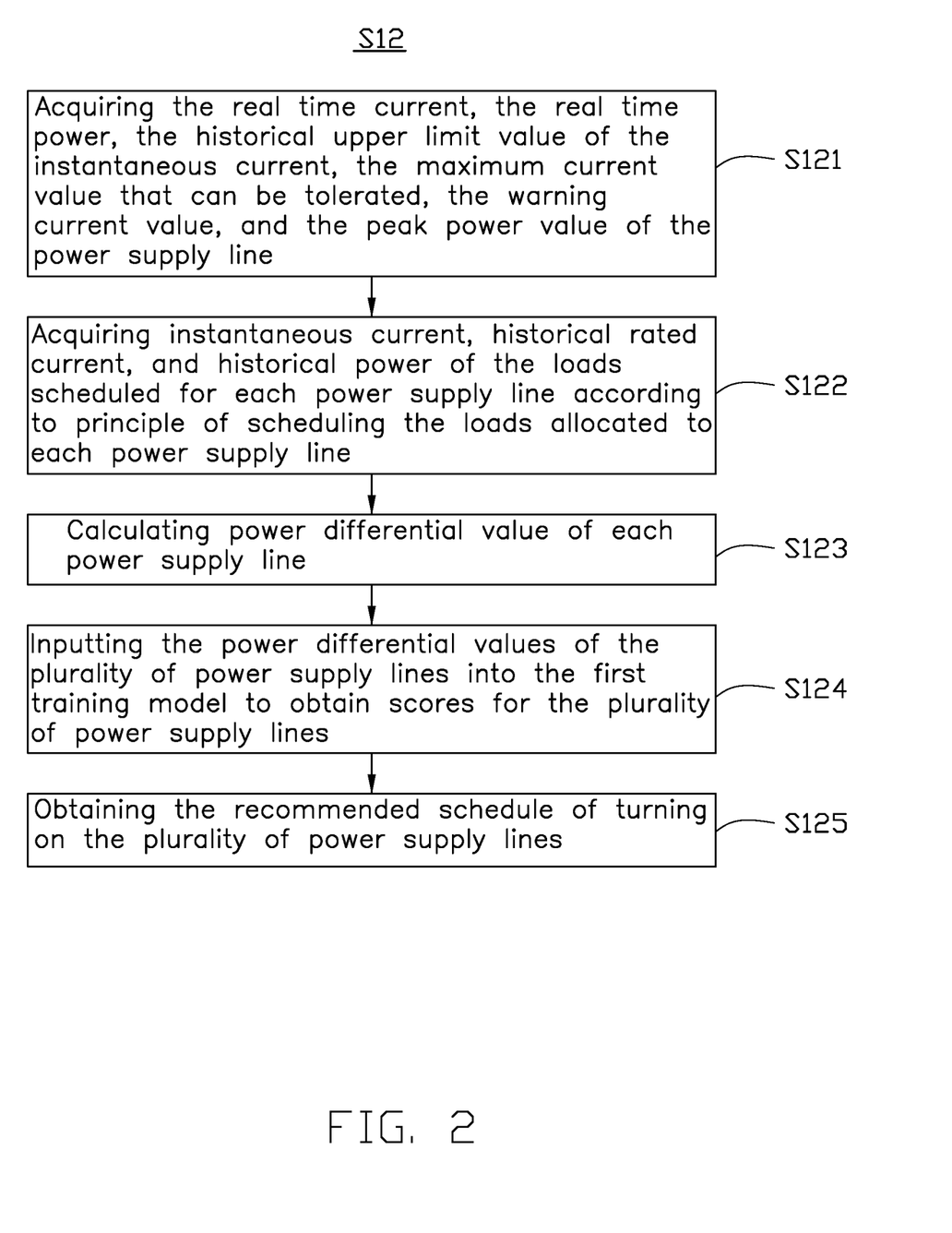
FIG. 2 is a flow diagram of implementing S12 of the power control method of FIG. 1.

FIG. 2 shows a flow diagram of implementing step S12 of the power control method. Referring to FIG. 2, the step of obtaining a recommended schedule of the plurality of power supply lines of S12 comprises:

S121: acquiring the real time current, the real time power, the historical upper limit value of the instantaneous current, the maximum current value that can be tolerated, the warning current value, and the peak power value of the power supply line.

The real time current and the real time power of the power supply lines refer to a real time current value and a real time power value of the power supply lines at the current moment.

For example, ten power supply lines are provided, and the real time current values and the real time power values of the ten power supply lines are acquired individually, then the historical upper limit values of the instantaneous current, the maximum current values that can be tolerated, the warning current values, and the peak power values corresponding to the ten power supply lines can be acquired individually based on the historical electric power data of the ten power supply lines.

S122: acquiring instantaneous current, historical rated current, and historical power of the loads scheduled for each power supply line according to principle of scheduling the loads allocated to each power supply line.

Specifically, the principle of scheduling the loads provides permutations and combinations of optionally enabling the loads allocated to each power supply line.

For example, the instantaneous current of the loads allocated to the ten power supply lines can be acquired according to the principle of scheduling the loads allocated to the ten power supply lines. The historical rated current and the historical power of the loads allocated to the ten power supply lines can be acquired according to the historical electric power data of the ten power supply lines.

It should be noted that, the principle of scheduling the loads is the number of the loads that are being used on each power supply line.

S123: calculating a power differential value of each power supply line according to the real-time current, real-time power, the instantaneous current of the load, the historical upper limit value of the instantaneous current, the maximum current value that can be tolerated, the warning current value, the peak power value, and the rated current and rated power of the load connected to the power supply lines.

In the embodiment, the power differential value comprises instantaneous current differential value, differential value of the maximum current that can be tolerated, warning current differential value, and peak power differential value of the power supply line.

The instantaneous current differential value is a differential value between the upper limit value of the instantaneous current of the power supply line and a sum of the real-time current of the power supply line and the instantaneous current of the load connected to the power supply line, and can be expressed as follows:

the instantaneous current differential value=the upper limit value of the instantaneous current of the power supply line−(the real-time current of the power supply line+the instantaneous current of the load connected to the power supply line);

wherein the differential value of the maximum current that can be tolerated by the power supply line is a differential value between the maximum current that can be tolerated by the power supply line and a sum of the real-time current of the power supply line and the instantaneous current of the load connected to the power supply line that scheduled to be turned on, and can be expressed as follows:

the differential value of the maximum current that can be tolerated by the power supply line=the maximum current that can be tolerated by the power supply line−(real-time current of the power supply line+the instantaneous current of the load connected to the power supply line that is scheduled to turn on);

wherein the warning current differential value of the power supply line is a differential value between the warning current value of the power supply line and a sum of the real-time current value of the power supply line and the rated current of the load connected to the power supply line that is scheduled to be turned on, and can be expressed as follows:

the warning current differential value=the warning current value of the power supply line−(the real-time current value of the power supply line+the rated current of the load connected to the power supply line that is scheduled to turn on);

wherein the peak power differential value of the power supply line is a differential value between the peak power value of the power supply line and a sum of the real-time power of the power supply line and the rated power of the load connected to the power supply line that is scheduled to be turned on, and can be expressed as follows:

the peak power differential value of the power supply line=the peak power value of the power supply line−(the real-time power of the power supply line+the rated power of the load connected to the power supply line that is scheduled to turn on).

For example, if the upper limit value of the instantaneous current of the power supply line is 10 A, the real-time current of the power supply line is 2 A, the instantaneous current of the load connected to the power supply line is 3 A, then the instantaneous current differential value will be 10 A−2 A−3 A=5 A; the above calculation rules are applicable to the calculation of the differential value of the maximum current that can be tolerated, the warning current differential value, and the peak power differential value of the power supply line.

S124: inputting the power differential values of the plurality of power supply lines into the first training model to obtain scores for each of the plurality of power supply lines.

For example, the first training model is a reinforcement learning model, the power differential values of the ten power supply lines are input into the pre-trained reinforcement learning model, wherein a first type of power supply line gets a high score such as 90 if the instantaneous current differential value, the differential value of the maximum current that can be tolerated, the warning current differential value, and peak power differential value of the first type of power supply line are above zero; a second type of power supply line gets a medium score such as 60 if the instantaneous current differential value, the differential value of the maximum current that can be tolerated by the second type of power supply line is higher than zero and the warning current differential value and peak power differential value of the second type of power supply line are lower than zero; a third type of power supply line gets a low score such as 30 if the instantaneous current differential value, the differential value of the maximum current that can be tolerated, the warning current differential value, and peak power differential value of the third type of power supply line are below zero.

When heavy loads such as refrigerators/freezers and air compressors connected to the power supply line are turned on, the original current of the power supply line is increased by a certain amount by the current of the power supply line or the instantaneous current of the load within a certain period of time, which can exceed the maximum current that can be tolerated by the power supply line and/or the warning current value and cause tripping out and power outages. Therefore, the priority task of the power control is to avoid current of each power supply line exceeding the instantaneous current, warning current, etc., so that the load can operate normally.

Instead of inputting the factors such as the real-time current and the real-time power into the reinforcement learning model, the embodiment inputs the differential value between the upper limit value of the instantaneous current of the power supply line and a sum of the real-time current of the power supply line and the instantaneous current of the load connected to the power supply line into the reinforcement learning model to train and obtain the recommended schedule of turning on the plurality of power supply lines, which avoids current of the power supply line exceeding the instantaneous current, the warning current, and the historical peak power value, and reduces peak values of the power supply line.

S125: obtaining the recommended schedule of turning on the plurality of power supply lines by ranking the power supply lines according to their scores.

For example, based on the scores obtained by the ten power supply lines, each power supply line is ranked from high to low according to its score, and a recommended schedule of turning on each of the ten power supply lines is obtained.

It should be noted that the recommended schedule of turning on the power supply lines is a sheet ranking of each power supply line, from high to low, according to its score.

S13: performing a first modification to the recommended schedule of turning on the power supply lines according to the status data of the plurality of power supply lines to obtain a first modified recommended schedule of turning on the power supply lines.

Specifically, power supply lines among the plurality of power supply lines can be identified and removed from the recommended schedule by the first modification of the recommended schedule with the status data of the plurality of power supply lines, then only available power lines are reserved.

Figure 3:
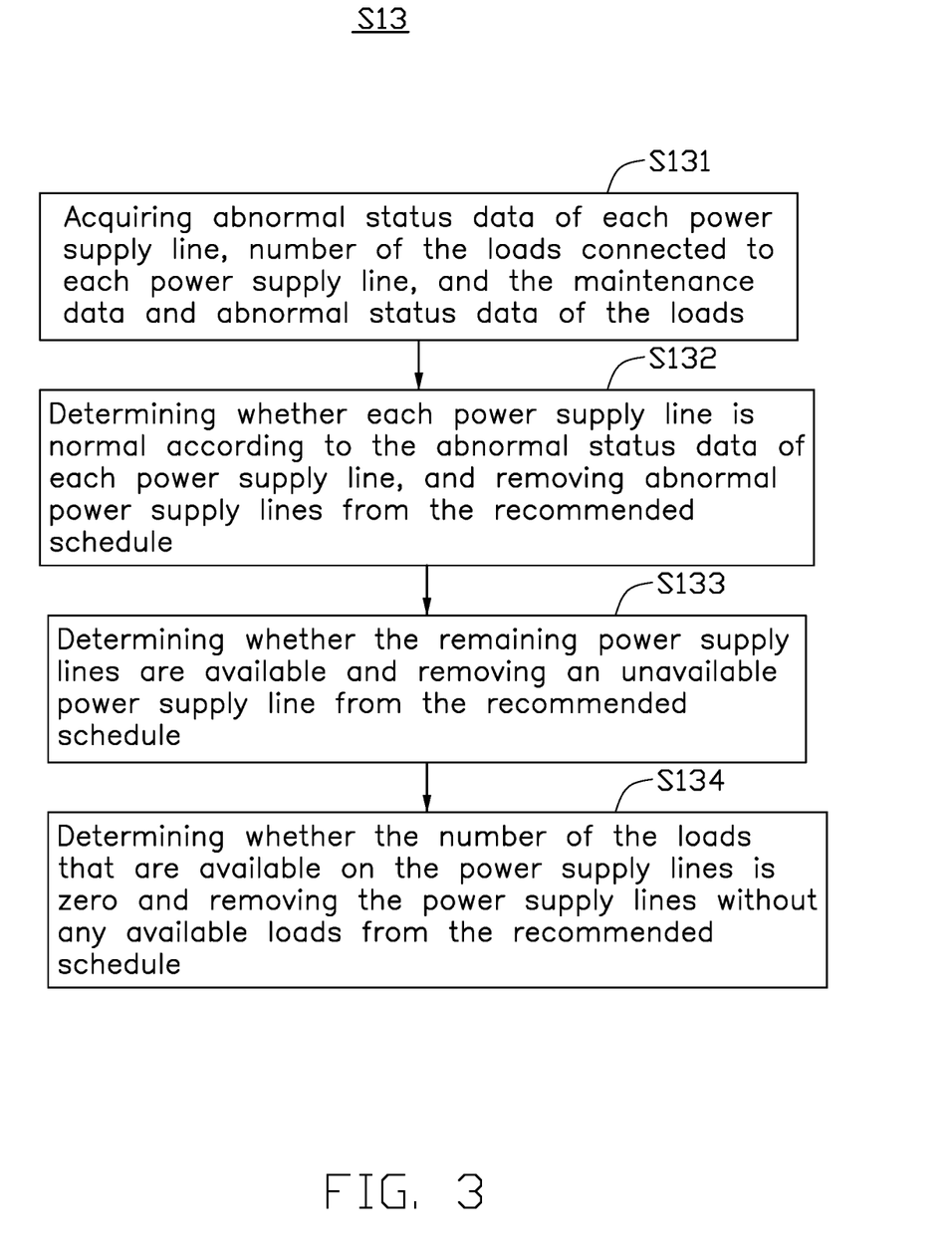
FIG. 3 is a flow diagram of implementing S13 of the power control method of FIG. 1.

FIG. 3 is a flow diagram of implementing the step S13 of the power control method. Referring to FIG. 3, the step S13 comprises:

S131: acquiring abnormal status data of each power supply line, number of the loads connected to each power supply line, and the maintenance data and abnormal status data of the loads.

For example, the abnormal status data of ten power supply lines, the number of the loads allocated to the ten power supply lines, and the maintenance data and abnormal status data of the loads can be acquired in real time.

S132: determining whether each power supply line is normal according to the abnormal status data of each power supply line, and removing abnormal power supply lines from the recommended schedule.

For example, if one power supply line out of ten is determined as unusable according to the abnormal status data of the ten power supply lines, then the one power supply line is removed from the recommended schedule.

S133: determining whether the remaining power supply lines are available, and removing an unavailable power supply line from the recommended schedule.

For example, if one of the nine remaining power supply lines is determined as unusable or unavailable due to maintenance, and no load is found to be connected to the power supply line, this means that the power supply line is unused temporarily or otherwise, and the one power supply line should be removed from the recommended schedule.

S134: determining whether the number of the loads that are available on the power supply lines is zero according to the maintenance data and abnormal status data of the loads connected to the power supply lines, and removing the power supply lines without any available loads from the recommended schedule. Alternatively or additionally, determining whether the number of the loads available on the power supply lines is equal to that of the working loads, and removing the power supply lines with equal number of working loads from the recommended schedule.

For example, among the remaining eight power supply lines, if it is determined that the waiting load of one of the power supply lines is zero or equal to the working load, then there is no excess waiting load, and this one power supply line can be removed from the recommended schedule.

In this embodiment, the differential value between the upper limit value of the instantaneous current of the power supply line and a sum of the real-time current of the power supply line and the instantaneous current of the load allocated to the power supply line are used as the input factors of the reinforcement learning model, and in combining with the status data of the power supply line, a better recommended schedule of turning on the power supply lines can be obtained.

S14: inputting operation data of remaining power supply lines in the first modified recommended schedule into a second training model to obtain a correction factor for each power supply line.

Figure 4:
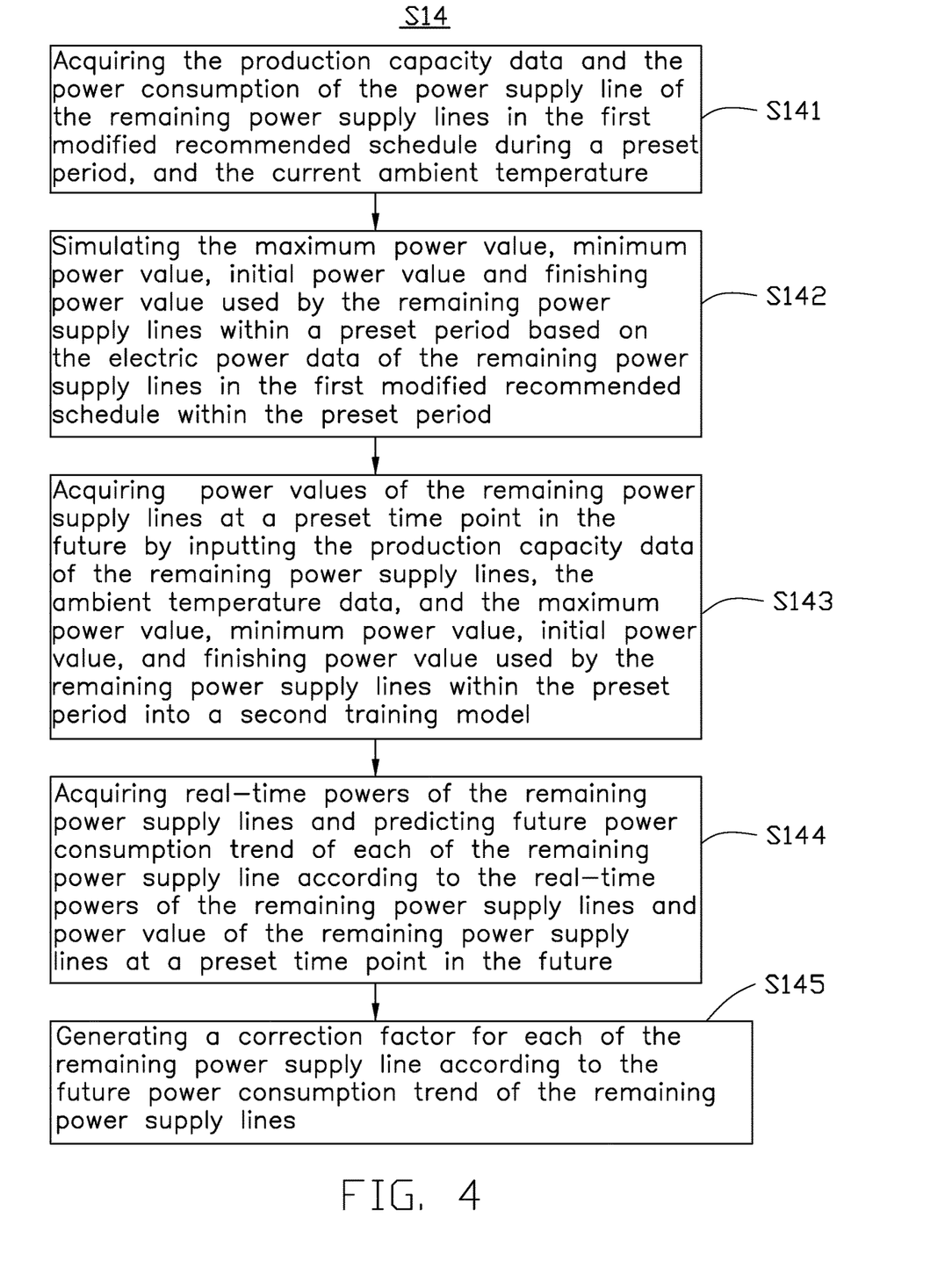
FIG. 4 is a flow diagram of implementing S14 of the power control method of FIG. 1.

FIG. 4 a flow diagram of implementing the step S14 of the power control method. Referring to FIG. 4, the step S14 comprises:

S141: acquiring the production capacity data and the power consumption of the power supply line of the remaining power supply lines in the first modified recommended schedule during a preset period, and the current ambient temperature.

For example, if 7 power supply lines remain in the first modified recommended schedule, then the production capacity data of the 7 power supply lines is acquired, such as planned production capacity in next 15 days and the current ambient temperature.

S142: simulating the maximum power value, minimum power value, initial power value and finishing power value used by the remaining power supply lines within a preset period based on the electric power data of the remaining power supply lines in the first modified recommended schedule within the preset period.

For example, based on the electric power data of the 7 remaining power supply lines in the first modified recommended schedule within one month, the maximum power value, minimum power value, initial power value and finishing power value used by the 7 power supply lines within a month.

S143: acquiring power values of the remaining power supply lines at a preset time point in the future by inputting the production capacity data of the remaining power supply lines, the ambient temperature data, and the maximum power value, minimum power value, initial power value, and finishing power value used by the remaining power supply lines within the preset period into a second training model.

For example, the second training model is a time series model, the production capacity data of the 7 power supply lines, the ambient temperature data, and the maximum power value, the minimum power value, the initial power value, and finishing power value used by the 7 power supply lines within a month are input into the pre-trained time series model to obtain the power value of the 7 power supply lines at a preset time point in the future, such as the power value after 15 minutes. According to this embodiment, the time series model can be updated in real time by the data in the arrangement sheet.

According to the embodiment, the time series model is used to reasonably predict the multi-phase future power consumption trend of the power supply lines, which reduces the fluctuation caused by the uncertainty of future power consumption, improves the accuracy of the model prediction, and avoids inappropriate options.

S144: acquiring real-time powers of the remaining power supply lines and predicting future power consumption trend of each of the remaining power supply line according to the real-time powers of the remaining power supply lines and power value of the remaining power supply lines at a preset time point.

For example, the real-time power of the 7 power supply lines at present is acquired, then the power consumption trend of the 7 remaining power supply lines in the future 15 minutes can be predicted according to the real-time power of the 7 power supply lines at the present and the power value of the 7 power supply lines 15 minutes in the future.

S145: generating a correction factor for each of the remaining power supply line according to the predicted future power consumption trend of the remaining power supply lines.

For exemplary, a correction factor is generated for each of the remaining power supply line according to the predicted further power consumption trend of the 7 power supply lines.

For example, the power consumption trend of a remaining power supply line A is rising, then its correction factor is a number less than 1, when the range of power consumption rising is 200 KW, the correction factor is 0.8, when the power consumption rising range is 500 KW, the correction factor is 0.6.

The power consumption trend of a remaining power supply line B is decreasing, then its correction factor is a number greater than 1, such as 1.2.

The power consumption trend of a remaining power supply line C remains unchanged, then its correction factor is a 1.

The future power consumption change of each power supply line is an important factor affecting the selection of power supply lines. An optimal power supply line at present does not mean that this power supply line will also be optimal in the future, for example, the power consumption of this power supply line can be increased by additional work or production. Considering that the selection of the power supply line is affected by the future change of the power consumption of the power supply line, in this embodiment, the future power consumption of each power supply line is predicted in advance, and certain adjustments are made to positions of the power supply lines whose power will increase in the future in the recommended schedule, that is, the peak power values of the power supply lines whose power will increase in the future are multiplied by a certain correction factor and then ranked again, while the power supply line whose power will drop in the future will not be adjusted for the time being, so as to reduce the possibility of misjudgment.

S15: performing a second modification on the first modified recommended schedule of turning on the plurality of power supply lines by the correction factors to obtain a second modified recommended schedule of turning on the plurality of power supply lines.

Figure 5:
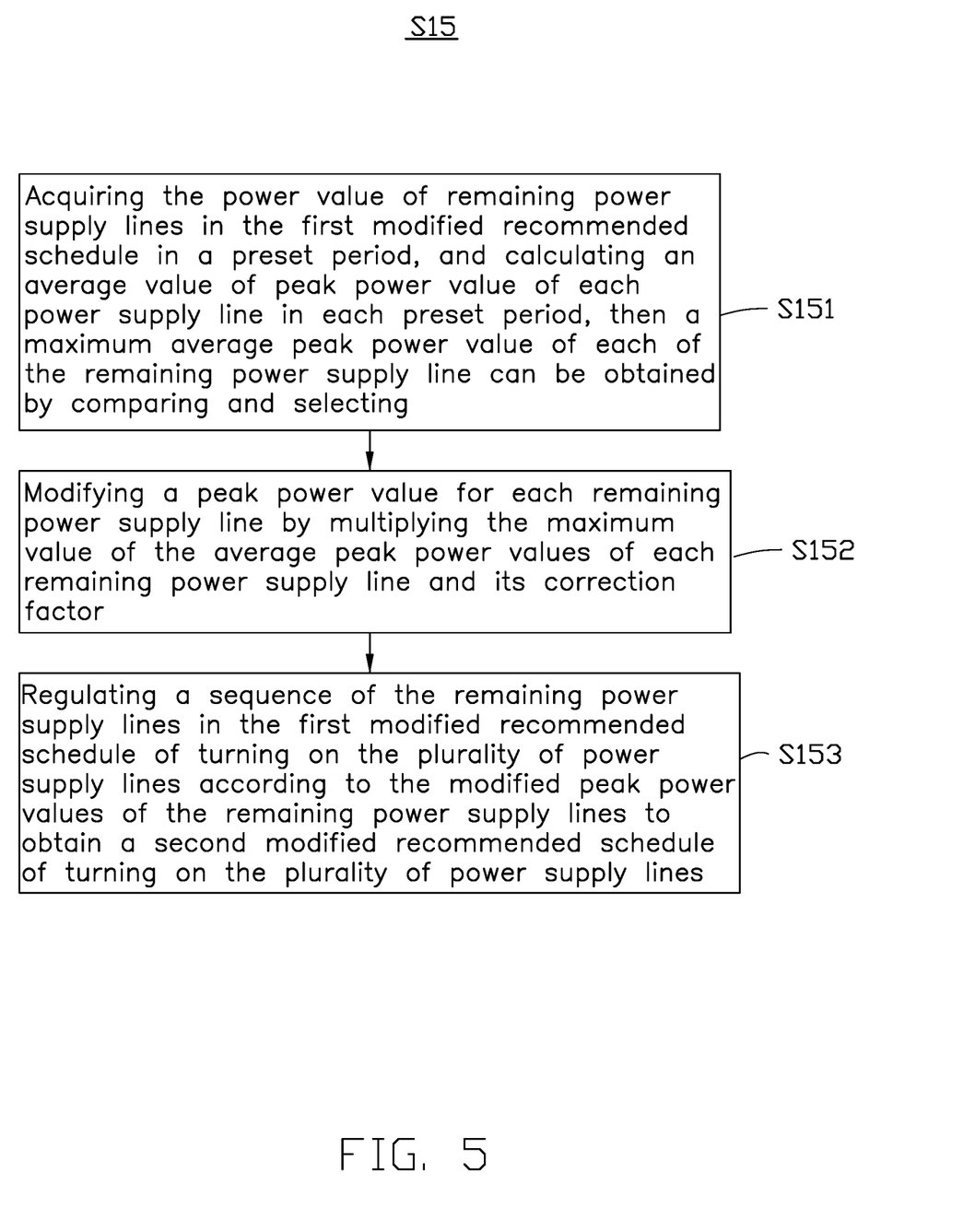
FIG. 5 is a flow diagram of implementing S15 of the power control method of FIG. 1.

FIG. 5 is a flow diagram of implementing step S15 of the power control method. Referring to FIG. 5, the step S15 comprises:

S151: acquiring the power value of remaining power supply lines in the first modified recommended schedule in a preset period, and calculating an average value of peak power value of each power supply line in each preset period, then a maximum average peak power value of each of the remaining power supply line can be obtained by comparing and selecting.

For example, there are 7 power supply lines remaining in the first modified recommended schedule, the power values of the 7 power supply lines in a month are acquired, then the month is divided into 120 time periods based on the time interval of fifteen minutes, and the peak power values of the 7 power supply lines in the 120 time periods can be determined, then an average value of the peak power values of the 7 power supply lines in the 120 time periods can be calculated, and the maximum value of the average peak power values of the 7 remaining power supply lines can be obtained by comparing the average peak power values of the 7 remaining power supply lines in the 120 time periods.

S152: modifying a peak power value for each remaining power supply line by multiplying the maximum value of the average peak power values of each remaining power supply line and its correction factor.

For example, the maximum value of the average peak power values of each of the 7 remaining power supply lines is multiplied with respective correction factor to obtain modified peak power values of the 7 remaining power supply lines.

S153: regulating a sequence of the remaining power supply lines in the first modified recommended schedule of turning on the plurality of power supply lines according to the modified peak power values of the remaining power supply lines to obtain a second modified recommended schedule of turning on the plurality of power supply lines.

For example, the 7 power supply lines can be modified and reranked according to the modified peak power values of the 7 power supply lines to obtain a second modified recommended schedule of turning on the plurality of power supply lines.

According to the embodiment, the correction factor of the historical peak power value of the power supply line is introduced to ensure that the power supply lines recommended in the recommended schedule can consume electric power smoothly and reduce the electric power consumption.

S16: acquiring the optimal power supply line to turn on according to the second modified recommended schedule.

S17: turning on the loads on the optimal power supply line.

According to the power control method above, the recommended schedule of turning on the plurality of power supply lines is obtained by inputting the scheduling information of the power supply lines, then the recommended schedule is first modified according to the status data of the plurality of power supply lines, the operation data of the remaining power supply line in the first modified recommended schedule is input into the time series model to obtain the correction factor of each remaining power supply line, then the first modified recommended schedule is second modified by the correction factor to acquire the optimal power supply line to turn on, then the loads on the optimal power supply line can be turned on to realize an appropriate line is selected and used according to requirements.

The above-mentioned power control method provides the recommended schedule of turning on the optimal power supply line based on the deep reinforcement learning model and the time series model, the optimal power supply line ready to turn on is selected by the recommended schedule, which reduces manual participation and improves accuracy of predicting the power supply lines in the future, therefore, improper selection causing serious increase of the maximum demand for electric power can be avoided, the power consumption of the power supply lines can be stabilized, the maximum demand for electric power can be reduced, and the electric power can be saved.

Figure 6:
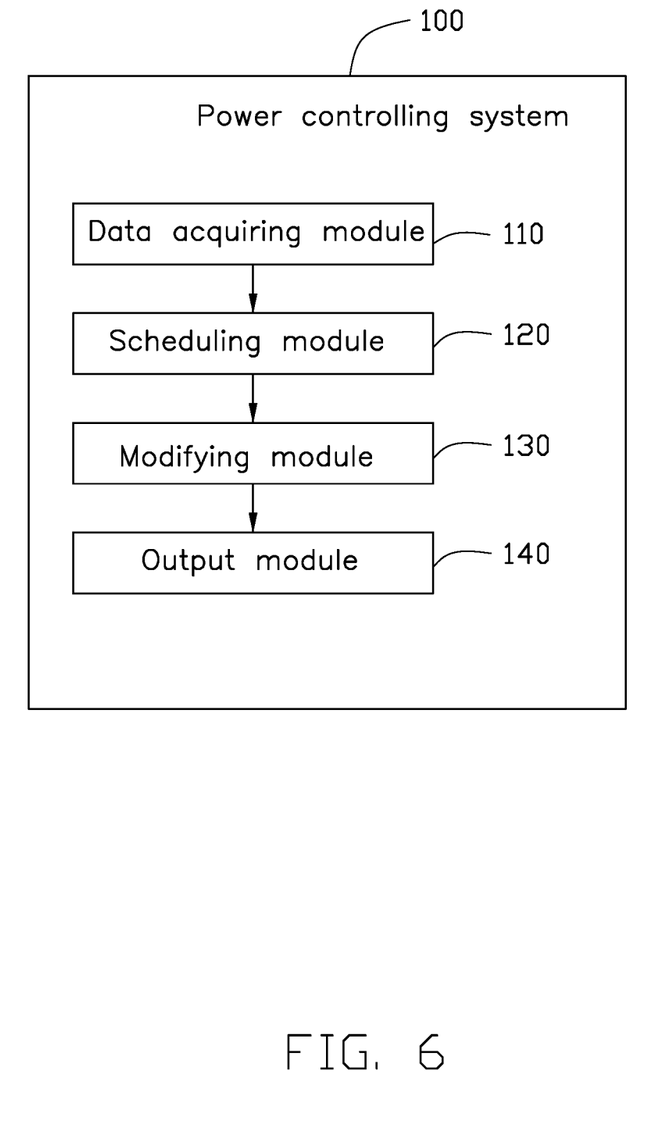
FIG. 6 is a high-level diagram of a power control system of the power control method of FIG. 1.

FIG. 6 is a high-level diagram of a power control system of the power control method, the power control system 100 comprises a data acquiring module 110, a scheduling module 120, a modifying module 130, and an output module 140.

Specifically, the data acquiring module 110 is configured for acquiring scheduling information of a plurality of power supply lines, wherein the scheduling information includes electric power data, status data, and operation data of the power supply line; the scheduling module 120 is configured for inputting the electric power data of the plurality of power supply lines into a first training model to obtain a recommended schedule of turning on the plurality of power supply lines; the modifying module 130 is configured for modifying the recommended schedule of turning on the power supply lines according to the status data and operation data of the plurality of power supply lines to obtain an optimal power supply line to turn on; the output module 140 is configured for turning on the loads on the optimal power supply line.

Therefore, the data acquiring module 110 acquires scheduling information of a plurality of power supply lines, wherein the scheduling information includes electric power data, status data, and operation data of the power supply line; the scheduling module 120 inputs the electric power data of the plurality of power supply lines into a first training model to obtain a recommended schedule of turning on the plurality of power supply lines; the modifying module 130 modifies the recommended schedule of turning on the power supply lines according to the status data and operation data of the plurality of power supply lines to obtain an optimal power supply line to turn on; the output module 140 turns on the loads on the optimal power supply line, then appropriate lines can be recommended according to actual requirements, waste of electric power caused by selecting power supply line with excessive capacity or the tripping out caused by selecting power supply line with inadequate capacity can be avoided.

Figure 7:
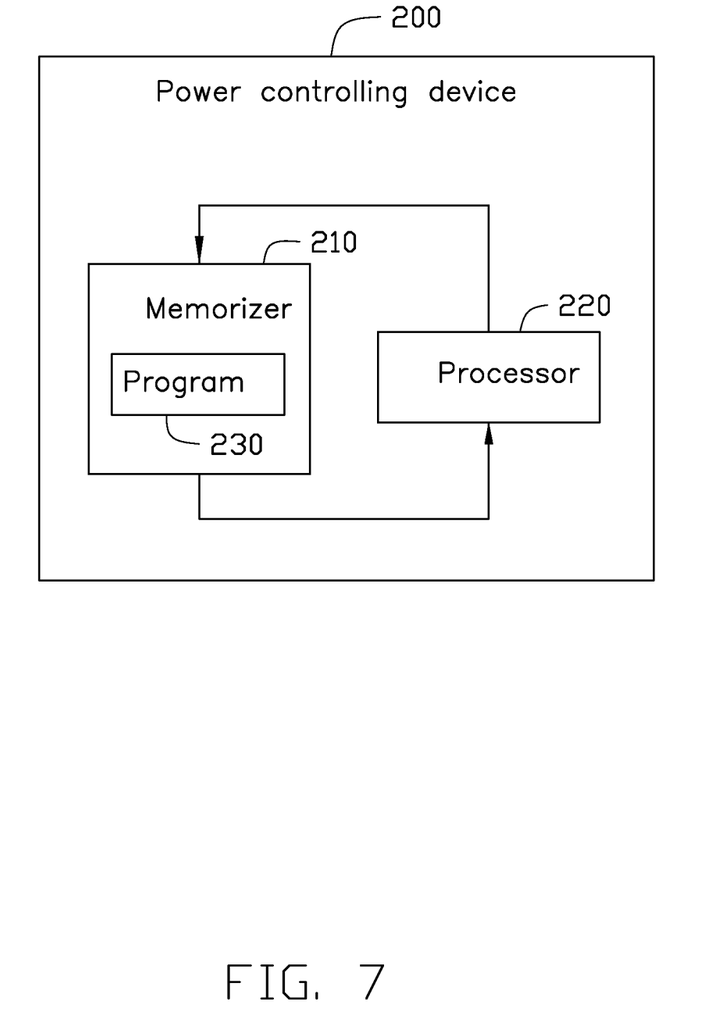
FIG. 7 is a diagram of a power control device of the power control method of FIG. 1.

FIG. 7 shows a power control device of the power control method. The power control device 200 comprises a memorizer 210, a processor 210, and a program 230 stored on the memorizer 210 and executable by the processor 220, the program 230 is executed by the processor 220 to implement steps of the power control method according to the embodiments above.

Therefore, the power control device 200 implements the steps of the power control method according to the embodiments above by the processor 220, to obtain the recommended power supply line according to the equipment used in actuality.

For example, the program 230 can be divided into one or more modules stored in the memorizer 210 and can be executed by the processor 220 to implement the method. The one or more modules can be a series of computer program instruction segments capable of performing specific functions, and the instruction segments are used to describe the execution process of the program 230 in the power control device 200.

The processor 220 can be any one or more of a central processing unit (CPU), a general-purpose processor, a digital signal processor (DSP), an application specific integrated circuit (ASIC), a field-programmable gate array (FPGA), and other programmable logic device, a discrete gate, a transistor logic device, a discrete hardware components, and so on. The general-purpose processor can be selected from a microprocessor, a processor, and any other processor, the processor 220 is a control center of the power control device 200 and is connected to all parts of the power control device 200 via various interfaces and wires.

The memorizer 210 is configured for storing the program 230 and/or the modules, the processor 220 implements various functions of the power control device 200 by running or executing the program 230 and/or modules stored in the memorizer 210 and calling up data stored in the memorizer 210. The memorizer 210 can include any one or more of an external storage medium, a memory, a high-speed random access memorizer, and a non-volatile memorizer, such as hard disk, an internal memorizer, a plug-in hard disk, a smart media card (SMC), a secure digital (SD) card, a flash card, at least one magnetic disk storage device, a flash memorizer device, and any other volatile solid state storage device.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A power control method, comprising:
    acquiring scheduling information of a plurality of power supply lines, wherein the scheduling information includes electric power data, status data, and operation data of the power supply lines;
    inputting the electric power data of the plurality of power supply lines into a first training model to obtain a recommended schedule of turning on the plurality of power supply lines;
    modifying the recommended schedule of turning on the power supply lines according to the status data and the operation data of the plurality of power supply lines to obtain an optimal power supply line; and
    turning on the loads connected to the optimal power supply line;
    wherein modifying the recommended schedule of turning on the power supply lines according to the status data and the operation data of the plurality of power supply lines to obtain an optimal power supply line comprises:
    performing a first modification to the recommended schedule of turning on the power supply lines according to the status data of the plurality of power supply lines to obtain a first modified recommended schedule of turning on the power supply lines;
    inputting operation data of remaining power supply lines in the first modified recommended schedule into a second training model to obtain a correction factor for each of the plurality of power supply lines;
    performing a second modification on the first modified recommended schedule of turning on the plurality of power supply lines by the correction factors to obtain a second modified recommended schedule of turning on the plurality of power supply lines; and
    acquiring an optimal power supply line to be turned on according to the second modified recommended schedule.

2. The power control method of claim 1, wherein
    the electric power data of the power supply lines comprises real-time electric power data and historical electric power data;
    inputting the electric power data of the plurality of power supply lines into a first training model to obtain a recommended schedule of turning on the plurality of power supply lines comprises:
    acquiring the historical electric power data of the plurality of power supply lines, wherein the historical electric power data comprises historical upper limit values of the instantaneous current, maximum current values that can be tolerated, warning current values, peak power values of the power supply lines, and rated currents and rated powers drawn by the loads connected to the power supply lines;

acquiring the real-time electric power data of the plurality of power supply lines at the present, wherein the real-time electric power data comprises real time current, real time power, instantaneous current of the loads connected to the power supply line;

calculating power differential value of each of the plurality of power supply lines according to the real-time electric power data and the historical electric power data of the plurality of power supply lines;

inputting the power differential values of the plurality of power supply lines into the first training model to obtain scores of each of the plurality of power supply lines;

ranking the plurality of power supply lines according to their scores and setting rules to obtain the recommended schedule of turning on the plurality of power supply lines.

3. The power control method of claim 2, wherein the power differential values of the power supply lines comprise instantaneous current differential values, differential values of the maximum current that can be tolerated, warning current differential values, and peak power differential values of the power supply line; wherein the instantaneous current differential value is a differential value between the upper limit value of the instantaneous current of the power supply line and a sum of the real-time current of the power supply line and the instantaneous current of the load connected to the power supply line;

the differential value of the maximum current that can be tolerated by the power supply line is a differential value between the maximum current that can be tolerated by the power supply line and a sum of the real-time current of the power supply line and the instantaneous current of the load connected to the power supply line that is scheduled to be turned on;

the warning current differential value of the power supply line is a differential value between the warning current value of the power supply line and a sum of the real-time current value of the power supply line and the rated current of the load connected to the power supply line that is scheduled to be turned on;

the peak power differential value of the power supply line is a differential value between the peak power value of the power supply line and a sum of the real-time power of the power supply line and the rated power of the load connected to the power supply line that is scheduled to be turned on.

4. The power control method of claim 1, wherein the status data of the power supply lines comprises abnormal status data of the power supply line, and maintenance data and abnormal status data of the loads connected to the power supply line; and performing a first modification to the recommended schedule of turning on the power supply lines according to the status data of the plurality of power supply lines comprises:

acquiring the abnormal status data of each power supply line in the recommended schedule, number of loads connected to each power supply line, and the maintenance data and abnormal status data of the loads in real time;

determining whether each power supply line is normal according to the abnormal status data of each power supply line, and removing power supply lines which are abnormal from the recommended schedule;

determining whether the remaining power supply lines are available, and removing unavailable power supply lines of the remaining power supply lines from the recommended schedule; and determining whether the number of the loads that are available on the power supply lines is zero according to the maintenance data and abnormal status data of the loads connected to the power supply lines, and removing the power supply lines without any available loads from the recommended schedule to obtain the first modified recommended schedule of turning on the power supply lines.

5. The power control method of claim 1, wherein the operation data of the power supply line comprises production capacity data of the power supply line, power consumption of the power supply line during a preset period, and current ambient temperature; inputting operation data of remaining power supply lines in the first modified recommended schedule into a second training model to obtain a correction factor for each power supply line comprises:

acquiring the production capacity data and the power consumption of the power supply line of the remaining power supply lines in the first modified recommended schedule during a preset period, and the current ambient temperature;

simulating a maximum power value, a minimum power value, an initial power value and a finishing power value used by the remaining power supply lines within the preset period based on the electricity data of the remaining power supply lines in the first modified recommended schedule within the preset period;

inputting the production capacity data of the remaining power supply lines, the ambient temperature data, and the maximum power values, minimum power values, initial power values, and the finishing power values of the remaining power supply lines within the preset period into a second training model to obtain power values of the remaining power supply lines at a preset time point in the future;

acquiring real-time powers of the remaining power supply lines at the present time and predicting future power consumption trend of each of the remaining power supply line according to the real-time powers of the remaining power supply lines and the power values of the remaining power supply lines at the preset time point; and generating a correction factor for each of the remaining power supply line according to the future power consumption trend of the remaining power supply lines.

6. The power control method of claim 5, wherein the correction factor of one of the remaining power supply lines is set to be less than 1 if the future power consumption trend of said one of the remaining power supply lines is rising;

the correction factor of one of the remaining power supply lines is set to be greater than 1 if the future power consumption trend of said one of the remaining power supply lines is decreasing; and the correction factor of one of the remaining power supply lines is set to be 1 if the future power consumption trend of said one of the remaining power supply lines remains unchanged.

7. The power control method of claim 1, wherein performing a second modification on the first modified recommended schedule of turning on the plurality of power supply lines by the correction factors further comprises:
  acquiring power value of each of the remaining power supply lines in the first modified recommended schedule in a preset period;
  modifying a peak power value of each of the remaining power supply lines based on the power value of each of the remaining power supply lines in the preset period and the corresponding correction factors; and
  regulating a sequence of the remaining power supply lines in the first modified recommended schedule of turning on the plurality of power supply lines according to modified peak power values of the remaining power supply lines to obtain a second modified recommended schedule of turning on the plurality of power supply lines.

8. The power control method of claim 1, wherein modifying the power value of each of the remaining power supply lines comprises:
  dividing the preset period into multiple time periods according to a preset time interval;
  determining the peak power value of each of the remaining power supply lines in the multiple time periods based on the power value of each of the remaining power supply lines in the preset period, and calculating an average value of the peak power value of each of the remaining power supply lines in each time period;
  comparing the average value of the peak power value of each of the remaining power supply lines in the multiple time periods to select a maximum one for each of the remaining power supply line, and taking the maximum one as a maximum average peak power value of each of the remaining power supply line; and
  calculating a modified peak power value for each of the remaining power supply line by multiplying the maximum average peak power value of each of the remaining power supply line and its correction factor.

9. A power control system, comprising:
  a data acquiring module configured for acquiring scheduling information of a plurality of power supply lines, wherein the scheduling information includes electric power data, status data, and operation data of the power supply line;
  a scheduling module configured for inputting the electric power data of the plurality of power supply lines into a first training model to obtain a recommended schedule of turning on the plurality of power supply lines;
  a modifying module configured for modifying the recommended schedule of turning on the power supply lines according to the status data and operation data of the plurality of power supply lines to obtain an optimal power supply line to turn on; and
  an output module configured for turning on the loads on the optimal power supply line;
  wherein the modifying module further performs a first modification to the recommended schedule of turning on the power supply lines according to the status data of the plurality of power supply lines to obtain a first modified recommended schedule of turning on the power supply lines; the modifying module further inputs operation data of remaining power supply lines in the first modified recommended schedule into a second training model to obtain a correction factor for each of the plurality of power supply lines; the modifying module further performs a second modification on the first modified recommended schedule of turning on the plurality of power supply lines by the correction factors to obtain a second modified recommended schedule of turning on the plurality of power supply lines; the modifying module further acquires an optimal power supply line to be turned on according to the second modified recommended schedule.

10. A power control device, comprising a memorizer, a processor, and a program stored on the memorizer and executable by the processor, wherein the program is executed by the processor to implement following steps:
  acquiring scheduling information of a plurality of power supply lines, wherein the scheduling information includes electric power data, status data, and operation data of the power supply lines;
  inputting the electric power data of the plurality of power supply lines into a first training model to obtain a recommended schedule of turning on the plurality of power supply lines;
  modifying the recommended schedule of turning on the power supply lines according to the status data and the operation data of the plurality of power supply lines to obtain an optimal power supply line; and
  turning on the loads connected to the optimal power supply line;
  wherein modifying the recommended schedule of turning on the power supply lines according to the status data and the operation data of the plurality of power supply lines to obtain an optimal power supply line comprises:
  performing a first modification to the recommended schedule of turning on the power supply lines according to the status data of the plurality of power supply lines to obtain a first modified recommended schedule of turning on the power supply lines;
  inputting operation data of remaining power supply lines in the first modified recommended schedule into a second training model to obtain a correction factor for each of the plurality of power supply lines;
  performing a second modification on the first modified recommended schedule of turning on the plurality of power supply lines by the correction factors to obtain a second modified recommended schedule of turning on the plurality of power supply lines; and
  acquiring an optimal power supply line to be turned on according to the second modified recommended schedule.

11. The power control device of claim 10, wherein
  the electric power data of the power supply lines comprises real-time electric power data and historical electric power data;
  inputting the electric power data of the plurality of power supply lines into a first training model to obtain a recommended schedule of turning on the plurality of power supply lines comprises:
  acquiring the historical electric power data of the plurality of power supply lines, wherein the historical electric power data comprises historical upper limit values of the instantaneous current, maximum current values that can be tolerated, warning current values, peak power values of the power supply lines, and rated currents and rated powers drawn by the loads connected to the power supply lines;
  acquiring the real-time electric power data of the plurality of power supply lines at the present, wherein the real-time electric power data comprises real time current, real time power, instantaneous current of the loads connected to the power supply line;

calculating power differential value of each of the plurality of power supply lines according to the real-time electric power data and the historical electric power data of the plurality of power supply lines;
inputting the power differential values of the plurality of power supply lines into the first training model to obtain scores of each of the plurality of power supply lines;
ranking the plurality of power supply lines according to their scores and setting rules to obtain the recommended schedule of turning on the plurality of power supply lines.

12. The power control device of claim 11, wherein
the power differential values of the power supply lines comprise instantaneous current differential values, differential values of the maximum current that can be tolerated, warning current differential values, and peak power differential values of the power supply line; wherein
the instantaneous current differential value is a differential value between the upper limit value of the instantaneous current of the power supply line and a sum of the real-time current of the power supply line and the instantaneous current of the load connected to the power supply line;
the differential value of the maximum current that can be tolerated by the power supply line is a differential value between the maximum current that can be tolerated by the power supply line and a sum of the real-time current of the power supply line and the instantaneous current of the load connected to the power supply line that is scheduled to be turned on;
the warning current differential value of the power supply line is a differential value between the warning current value of the power supply line and a sum of the real-time current value of the power supply line and the rated current of the load connected to the power supply line that is scheduled to be turned on;
the peak power differential value of the power supply line is a differential value between the peak power value of the power supply line and a sum of the real-time power of the power supply line and the rated power of the load connected to the power supply line that is scheduled to be turned on.

13. The power control device of claim 10, wherein the status data of the power supply lines comprises abnormal status data of the power supply line, and maintenance data and abnormal status data of the loads connected to the power supply line; and
performing a first modification to the recommended schedule of turning on the power supply lines according to the status data of the plurality of power supply lines comprises:
acquiring the abnormal status data of each power supply line in the recommended schedule, number of loads connected to each power supply line, and the maintenance data and abnormal status data of the loads in real time;
determining whether each power supply line is normal according to the abnormal status data of each power supply line, and removing power supply lines which are abnormal from the recommended schedule;
determining whether the remaining power supply lines are available, and removing unavailable power supply lines of the remaining power supply lines from the recommended schedule; and
determining whether the number of the loads that are available on the power supply lines is zero according to the maintenance data and abnormal status data of the loads connected to the power supply lines, and removing the power supply lines without any available loads from the recommended schedule to obtain the first modified recommended schedule of turning on the power supply lines.

14. The power control device of claim 10, wherein the operation data of the power supply line comprises production capacity data of the power supply line, power consumption of the power supply line during a preset period, and current ambient temperature; inputting operation data of remaining power supply lines in the first modified recommended schedule into a second training model to obtain a correction factor for each power supply line comprises:
acquiring the production capacity data and the power consumption of the power supply line of the remaining power supply lines in the first modified recommended schedule during a preset period, and the current ambient temperature;
simulating a maximum power value, a minimum power value, an initial power value and a finishing power value used by the remaining power supply lines within the preset period based on the electricity data of the remaining power supply lines in the first modified recommended schedule within the preset period;
inputting the production capacity data of the remaining power supply lines, the ambient temperature data, and the maximum power values, minimum power values, initial power values, and the finishing power values of the remaining power supply lines within the preset period into a second training model to obtain power values of the remaining power supply lines at a preset time point in the future;
acquiring real-time powers of the remaining power supply lines at the present time and predicting future power consumption trend of each of the remaining power supply line according to the real-time powers of the remaining power supply lines and the power values of the remaining power supply lines at the preset time point; and
generating a correction factor for each of the remaining power supply line according to the future power consumption trend of the remaining power supply lines.

15. The power control device of claim 14, wherein
the correction factor of one of the remaining power supply lines is set to be less than 1 if the future power consumption trend of said one of the remaining power supply lines is rising;
the correction factor of one of the remaining power supply lines is set to be greater than 1 if the future power consumption trend of said one of the remaining power supply lines is decreasing; and
the correction factor of one of the remaining power supply lines is set to be 1 if the future power consumption trend of said one of the remaining power supply lines remains unchanged.

16. The power control device of claim 10, wherein performing a second modification on the first modified recommended schedule of turning on the plurality of power supply lines by the correction factors further comprises:
acquiring power value of each of the remaining power supply lines in the first modified recommended schedule in a preset period;
modifying a peak power value of each of the remaining power supply lines based on the power value of each of the remaining power supply lines in the preset period and the corresponding correction factors; and regulating a sequence of the remaining power supply lines in the first modified recommended schedule of turning on the plurality of power supply lines according to modified peak power values of the remaining power supply lines to obtain a second modified recommended schedule of turning on the plurality of power supply lines.

17. The power control device of claim 10, wherein modifying the power value of each of the remaining power supply lines comprises:

dividing the preset period into multiple time periods according to a preset time interval;

determining the peak power value of each of the remaining power supply lines in the multiple time periods based on the power value of each of the remaining power supply lines in the preset period, and calculating an average value of the peak power value of each of the remaining power supply lines in each time period;

comparing the average value of the peak power value of each of the remaining power supply lines in the multiple time periods to select a maximum one for each of the remaining power supply line, and taking the maximum one as a maximum average peak power value of each of the remaining power supply line; and calculating a modified peak power value for each of the remaining power supply line by multiplying the maximum average peak power value of each of the remaining power supply line and its correction factor.

* * * * *